US008063762B2

(12) United States Patent
Sid

(10) Patent No.: US 8,063,762 B2
(45) Date of Patent: Nov. 22, 2011

(54) ALARM SYSTEM FOR MONITORING AT RURAL LOCATIONS

(75) Inventor: Alberto Sid, Upper Saddle River, NJ (US)

(73) Assignee: Goren Trade Inc., River Edge, NJ (US)

( * ) Notice: Subject to any disclaimer, the term of this patent is extended or adjusted under 35 U.S.C. 154(b) by 396 days.

(21) Appl. No.: 12/471,977

(22) Filed: May 26, 2009

(65) Prior Publication Data

US 2009/0289784 A1 Nov. 26, 2009

Related U.S. Application Data

(60) Provisional application No. 61/055,491, filed on May 23, 2008.

(51) Int. Cl.
*G08B 29/00* (2006.01)
*H04M 11/04* (2006.01)

(52) U.S. Cl. .................. 340/506; 340/531; 340/539.18; 340/540; 379/37; 379/41; 379/51; 455/404.1; 455/412.2

(58) Field of Classification Search .................. 340/506
See application file for complete search history.

(56) References Cited

U.S. PATENT DOCUMENTS

| | | | | |
|---|---|---|---|---|
| 5,008,927 | A | 4/1991 | Weiss et al. | |
| 5,475,374 | A | 12/1995 | Moore | |
| 5,542,117 | A | 7/1996 | Hendricks et al. | |
| 5,606,728 | A | 2/1997 | Keba et al. | |
| 5,884,224 | A | 3/1999 | McNabb et al. | |
| 6,049,273 | A | 4/2000 | Hess | |
| 6,138,032 | A | 10/2000 | Hill et al. | |
| 6,236,850 | B1 | 5/2001 | Desai | |
| 6,397,090 | B1 | 5/2002 | Cho | |
| 6,442,241 | B1 * | 8/2002 | Tsumpes | 379/45 |
| 6,944,687 | B2 | 9/2005 | Doragh et al. | |
| 6,978,149 | B1 | 12/2005 | Morelli et al. | |
| 7,340,615 | B2 | 3/2008 | Krantz et al. | |
| 2003/0117968 | A1 | 6/2003 | Motegi et al. | |
| 2004/0033812 | A1 | 2/2004 | Matsunaga et al. | |

* cited by examiner

*Primary Examiner* — Donnie Crosland
(74) *Attorney, Agent, or Firm* — Polster Lieder Woodruff & Lucchesi, L.C.

(57) ABSTRACT

A system for monitoring and reporting of alarm events occurring in a monitored system includes a power supply, a switch module, an alarm interface, an event message module and a system controller wherein the switch module provides active power to the event message module, the wireless communication module and the system controller only when an alarm event is detected.

28 Claims, 6 Drawing Sheets

600

ALARM SYSTEM FOR MONITORING AT RURAL LOCATIONS

CROSS REFERENCE TO RELATED APPLICATIONS

This application claims priority to U.S. Provisional Patent Application Ser. No. 61/055,491 that was filed May 23, 2008, which is incorporated by reference herein.

FIELD

The present disclosure relates to alarm systems for monitoring at rural locations and, in particular, relates to an alarm system suitable for monitoring remote premises where there is no electrical services or telephone lines available, such as agricultural systems and locations, campground, hunting lodge, tool shed, or warehouse.

BACKGROUND

The statements in this section merely provide background information related to the present disclosure and may not constitute prior art.

The present disclosure is particularly well adapted for implementation in securing agricultural irrigation systems such as a pivot move system described in U.S. Pat. No. 3,669,353, the entirety of which is incorporated herein by reference.

Pivot move systems include a radial arm which traverses a field being irrigated in a circular arc while sprinklers, positioned along the arm, irrigate the field. The pivot arm moves about a center point with the arm extending a significant distance, which can be several thousand feet. At the pivot point, electrical and electronic controls are located, together with a gas generator to power the system.

As illustrated in FIG. 2 and FIG. 3 of U.S. Pat. No. 3,669,353, wheeled ground engaging assemblies support the radial arm at spaced locations. The wheel speed of each assembly must be synchronized for correspondence because the wheels closer to the pivot rotate at a slower speed than the wheels progressively spaced from the pivot and traverse proportionately smaller distances.

A wiring harness extends the length of the arm and includes lines extending to each of the ground engaging assemblies for powering motors which drive the wheels, lights, water pumps, etc.

Because the irrigation systems are positioned in remote areas without supervision, security systems are employed to guard against vandalism and theft, including theft of the electrical wiring harness.

The wiring harness includes a closed loop to monitor the movement of the wheels for the purpose of shutting down operation in the event a wheel encounters an obstacle and is blocked from rotation.

In order to monitor the wheels, switches are provided adjacent each wheel, with the switch being activated when the wheel encounters an obstacle. All of the monitoring switches are connected in a normally closed monitoring loop.

This is different than previous systems that use phone dialers that simply access cellular or satellite telephone networks for communicating a serial communications protocol that is proprietary to each specific telephone manufacturer and/or cellular telephone carrier. These systems typically require proprietary wireless connectivity or auxiliary communication ports for interfacing with the phones. Specific adapters or other dedicated hardware are therefore often required. These adaptations for current systems result in relatively high implementation and connectivity costs.

SUMMARY

The inventor hereof has succeeded at designing a system that economically and effectively provides for the monitoring of remote systems and reporting an event such as an alarm from a monitored remote system to one or more remote locations over long periods of time without the need for local electrical power or a local telephone or data line. Such systems are particularly suited, in some embodiments, for monitoring agriculture, and other remote systems.

According to one aspect, a system for monitoring and reporting of alarm events occurring in a monitored system includes a power supply, a switch module, an alarm interface module, an event message module, a wireless communication module and a system controller. The power supply is dedicated to the system and has an output power interface for providing system power. The switch module receives system power from the power supply and has a power control input for receiving a power control signal. The switch module selectively provides the system power as active power responsive to the received power control signal. The alarm monitoring interface is configured for interfacing with the monitored system and is configured for receiving a plurality of status indicators from the remote monitored system and generating a signal indicating a change of state of a status indicator from the remote monitored system. The event message module has a memory for storing a plurality of event messages wherein each event message includes audio message having a unique event message identifier. The event message modules has a control input for receiving a message control signal including an event message identifier selected from the plurality of event message identifiers and an output audio interface for transmitting the event message corresponding to the received event message identifier. The event message module also has power input coupled to the switch module for receiving active power from the switch module. The wireless communication module has a memory for storing a plurality of predetermined wireless communication addresses, a power supply input coupled to the switch module for receiving active power, an event address input interface configured for receiving an event communication address, a controller receiving active power from the power supply input and the received event communication address from the event address input interface and determining a wireless communication address stored in the memory that is associated with the event communication address. The wireless communication module also includes a message input coupled to the event message module for receiving the event message and a wireless transceiver configured for communication over a wireless network and originating a communication to the particular wireless communication address associated with the event communication address for transmitting the event message. The system controller includes a microprocessor having at least an active mode and a sleep mode, a power interface coupled to the power supply for receiving system power, a state change interface coupled to the alarm monitoring interface for receiving the change of state signal, a message control interface for generating the message control signal including the event message identifier, a power activation interface for generating the power activation signal, and an addressing interface coupled to the event address input interface of the wireless communication module for transmitting the event communication address.

According to another aspect, a system for monitoring and reporting of events occurring at a rural location to a remote location includes a power supply, a switch module, an alarm monitoring interface, an event message module, a wireless communication module, a system controller, an address input actuator, and a housing. The power supply is dedicated to the system for providing system power. The switch module receives system power from the power supply and has a power control input for receiving a power control signal. The switch module selectively provides the system power as active power responsive to the received power control signal. The alarm monitoring interface is configured for interfacing with a plurality of monitored systems and for receiving a signal from each monitored system indicating a change of state. The event message module has a recorder/playback component having a memory for storing a plurality of event messages wherein each event message has a unique event message identifier and includes both a tone component and an audio voice message component. A control input is included in the event message module for receiving a message control signal including an event message identifier selected from the plurality of event message identifiers. An output audio interface is provided for transmitting the event message corresponding to the received event message identifier, and a power input is coupled to the switch module for receiving active power from the switch module. The event message module is configured to be un-powered when not receiving active power. The wireless handset is configured to be un-powered until receiving active power. The wireless handset has a memory for storing a plurality of telephone numbers as wireless communication addresses and a power supply input coupled to the switch module for receiving active power. A keypad is configured for receiving an event communication address and is modified to receive input from an address input actuator coupled to the wireless communication module. A controller receives the received event communication address from the address input actuator and determines a particular one of the wireless communication addresses, such as telephone numbers, that are associated with the event communication address. An audio interface is modified for receiving the event message from the event message module as an electrical signal. A wireless transceiver is configured for communication over a wireless network and originating a communication to the determined telephone and transmitting the event message over an established audio transmission link. The system controller has a microprocessor having at least an active mode and a sleep mode. A power interface is coupled to the power supply for receiving system power. A state change interface coupled to the alarm monitoring interface for receiving the change of state signal and a power activation interface for generating the power activation signal. The system controller is configured to detect the change of state signal from the alarm monitoring interface, to change state from the sleep mode to the active mode, to generate the power activation signal over the power interface, and to associate the change of state signal with an event communication address and an event message identifier. The system controller further includes a message control interface for generating the message control signal including the event message identifier and an addressing interface for transmitting the event communication address. The address input actuator is coupled to the keypad of the wireless handset for generating keypad input to the keypad in response to receiving the event communication address from the addressing interface of the system controller. The housing has a cavity configured for receiving and securing the power supply, the switch module, the event message module, the wireless handset, and the system controller there within.

According to yet another aspect, a system for monitoring and reporting of events occurring at rural locations includes a housing having a cavity with means for securing the housing in a closed position, means for providing system power, and means for detecting a change of state of a monitored system. The system also includes means for providing active power in response to detecting a change of state event and discontinuing the providing of active power when no change of state event is detected and means for determining an event communication address and event message associated with the detected change of state of a monitored system. The means for determining is in a sleep mode until receiving active power. The system further includes means for initiating a wireless communication over a wireless communication system to the wireless communication address responsive to detecting a change of state. The means for initiating wireless communication is un-powered until receiving active power from the means for providing active power. The system also includes means for transmitting the event message over the wireless communication in response to detecting a change of state event. The means for generating an event message is un-powered until receiving active power from the means for providing active power.

Further aspects of the present disclosure will be in part apparent and in part pointed out below. It should be understood that various aspects of the disclosure may be implemented individually or in combination with one another. It should also be understood that the detailed description and drawings, while indicating certain exemplary embodiments, are intended for purposes of illustration only and should not be construed as limiting the scope of the disclosure.

BRIEF DESCRIPTION OF THE DRAWINGS

It should be understood that throughout the drawings, corresponding reference numerals indicate like or corresponding parts and features.

DETAILED DESCRIPTION

Figure 1:
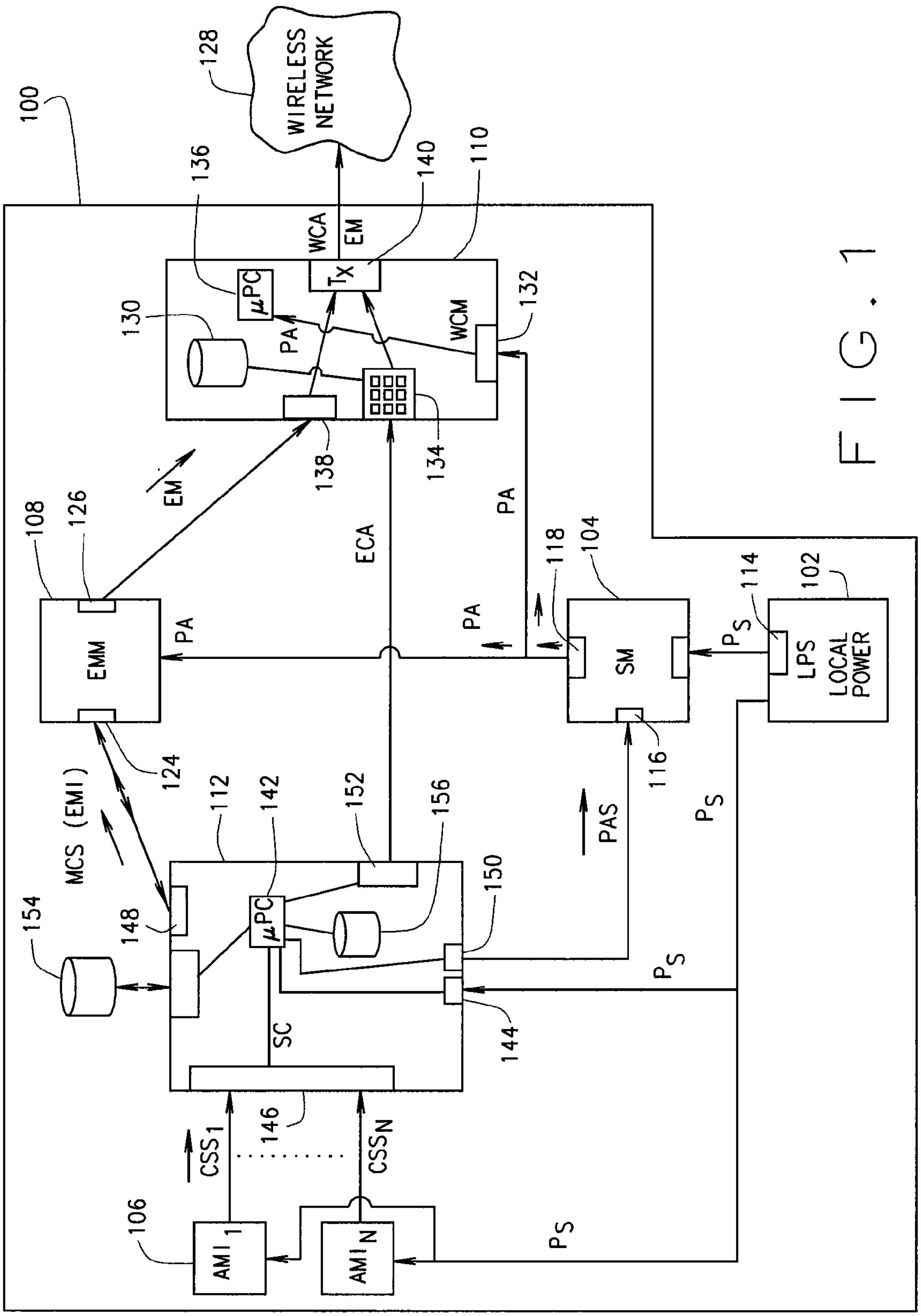
FIG. 1 is a block circuit diagram of one embodiment of a system for monitoring and reporting of alarm events according to one exemplary embodiment.

The following description is merely exemplary in nature and is not intended to limit the present disclosure or the disclosure's applications or uses.

Before turning to the figures and the various exemplary embodiments illustrated therein, a detailed overview of various embodiments and aspects is provided for purposes of breadth of scope, context, clarity, and completeness.

In some embodiments, a system for monitoring and reporting of alarm events occurring in a monitored system includes a power supply, a switch module, an alarm interface module, an event message module, a wireless communication module and a system controller.

The power supply is dedicated to the system and has an output power interface for providing system power. The switch module receives system power from the power supply and has a power control input for receiving a power control signal. The switch module selectively provides the system power as active power responsive to the received power control signal.

The alarm monitoring interface is configured for interfacing with the monitored system and is configured for receiving a plurality of status indicators from the remote monitored system and generating a signal indicating a change of state of a status indicator from the remote monitored system.

The event message module has a memory for storing a plurality of event messages wherein each event message includes audio message having a unique event message identifier. The event message modules has a control input for receiving a message control signal including an event message identifier selected from the plurality of event message identifiers and an output audio interface for transmitting the event message corresponding to the received event message identifier. The event message module also has power input coupled to the switch module for receiving active power from the switch module.

The wireless communication module has a memory for storing a plurality of predetermined wireless communication addresses, a power supply input coupled to the switch module for receiving active power, an event address input interface configured for receiving an event communication address, a controller receiving active power from the power supply input and the received event communication address from the event address input interface and determining a particular one of the predetermined wireless communication addresses stored in the memory that is associated with the event communication address. The wireless communication module also includes a message input coupled to the event message module for receiving the event message and a wireless transceiver configured for communication over a wireless network and originating a communication to the particular predetermined wireless communication address for transmitting the event message.

The system controller includes a microprocessor having at least an active mode and a sleep mode, a power interface coupled to the power supply for receiving system power, a state change interface coupled to the alarm monitoring interface for receiving the change of state signal, a message control interface for generating the message control signal including the event message identifier, a power activation interface for generating the power activation signal, and an addressing interface coupled to the event address input interface of the wireless communication module for transmitting the event communication address.

As shown in the exemplary embodiment of FIG. 1, a system 100 for monitoring and reporting of alarm events occurring in a monitored system includes a power supply 102, a switch module 104, an alarm monitoring interface 106, an event message module 108, a wireless communication module 110, and a system controller 112. As will be discussed, other components and modules and combinations thereof are also included within the scope of the present disclosure.

In various embodiments, the system 100 can be utilized for monitoring rural locations where there is no electrical service or telephone lines available. These can include agricultural systems and locations, campgrounds, hunting lodges, storage building, tool sheds, barns, or warehouse, by way of example. In accordance with one exemplary embodiment, the system 100 is configured for monitoring an irrigation system wheel monitoring loop that is employed for security monitoring of the irrigation system wheel in a remote rural location.

The power supply 102 is a dedicated power supply for the system 100 and components thereof. The power supply 102 can a self-contained power supply such as a battery or fuel cell that has an output power interface 114 for providing system power $P_S$. The power supply 102 includes in one embodiment a standard 6V "lantern" type Alkaline battery. While the power supply 102 can have an optional input for receiving external charging power (not shown), in many embodiments the power supply is a local power supply that does not receive any form of external power and as such is a standalone power supply that is replaced for restoring power.

The switch module 104 receives system power $P_S$ from the power supply 102 and has a power control input 116 for receiving a power control signal PAS. The switch module 104 is configured to selectively provide the system power $P_S$ to an output 118 as active power $P_A$ responsive to the received power control signal PAS. The switch module 104 receives the system power $P_S$ and can have two or more states. A first state can be one where no system power $P_S$ is provided as active power $P_A$, e.g., active power is zero, and a second state, that is activated when a power control signal PAS is received. In this state, the switch module 104 provides all or a portion of the received system power $P_S$ as active power $P_A$. One embodiment of the switch module 104 can include an electromechanical relay; however, the present disclosure is not limited to such a relay.

The alarm monitoring interface 106 is configured for interfacing with remote monitored system (not shown) that are being monitored, e.g., remote monitored systems. There is not a limit on what type of remote monitored systems or the quantity of the remote monitored systems that can be monitored by system 100. The alarm monitoring interface (AMI) 108 receives status indicators (not shown) from the remote monitored system that can include a simple on or off power, or open or close. Each of the remote monitored systems can have the same or a different type of status indicator that is monitored. These can include status indicators that are normally closed loops, normally open loops, event messages, variable voltage outputs, variable current outputs, and variable impedances. In one embodiment, the status indicator has two states; however, additional states are also possible.

The alarm monitoring interface 106 generates a signal CSS indicating a change of state of the monitored status indicators from the remote monitored system. In one embodiment, the alarm monitoring interface 106 has two electrical contacts and a resistance device shunted across the two electrical contacts. In some such embodiments, a power interface can be includes for receiving system power $P_S$ from the power supply 102. The alarm monitoring interface 106 can be configured to only provide a very low level of power (only a small portion of the received system power $P_S$, such that only very low power consumption is required for monitoring. In one such embodiment (as will be described in more detail with regard to FIG. 4, a field effect transistor (FET) has its gate coupled to detect an open between two electrical contacts connected to the monitored system. The FET generates a change of state signal in response to a detected open.

Figure 2:
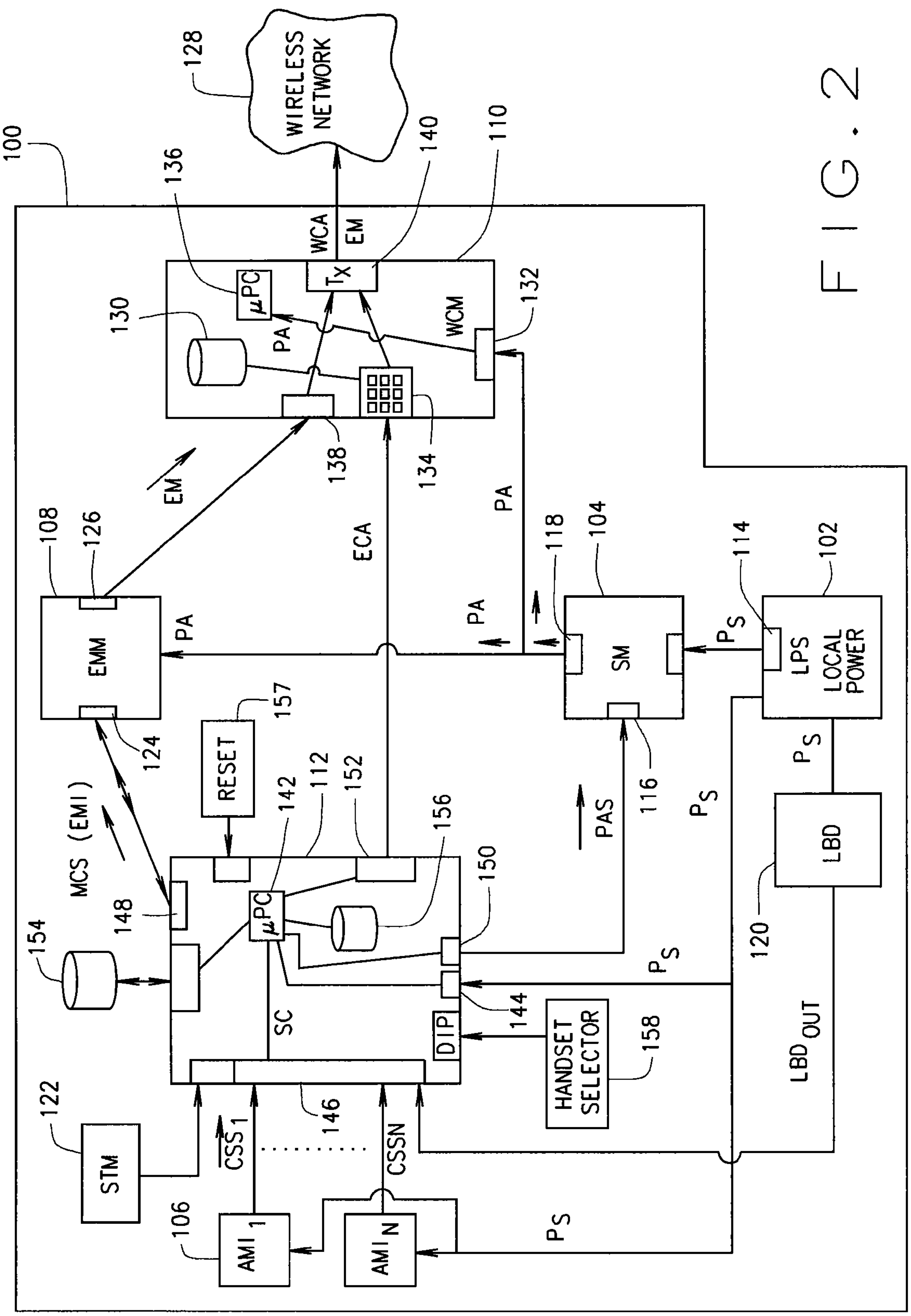
FIG. 2 is a block circuit diagram of an embodiment of a system for monitoring and reporting of alarm events according to a second exemplary embodiment.

In some embodiments, other interfaces can be developed that utilize the same interface to the system 100 as provided by the AMI 106. For example, as shown in FIG. 2, a low battery detection module 120 can provide for coupling with the power supply 102 for receiving system power $P_S$. The low battery detection module 120 monitors the level of the system power $P_S$ generated by the power supply 102 and determines when the system power $P_S$ is less than a predetermined power level. When the system power $P_S$ drops below the predetermined power level, the low battery detection module 120 generates a low battery signal $LBD_{Out}$. The system controller 112 receives the low battery signal $LBD_{Out}$ and initiate an action such as a notification to a maintenance center. For example, in one embodiment the system controller 112 receives the low battery signal $LBD_{Out}$ and treat the received low battery signal $LBD_{Out}$ as a monitored status indicator CSS. In such an embodiment, the $LBD_{Out}$ signal is processed by the system controller 112 as a change of state signal CSS received from the AMI 106, or at least similarly thereto. As will be described below, the system controller 112 initiates an event communication to the wireless communication address that can be a maintenance center or number for providing an indication or notification of a low battery.

In an embodiment as also shown in FIG. 2, a self-test module 122 is coupled to the system controller 112 for generating a pre-determined self-test event. The self-test event can include the generation of a self-test change of state signal CSS that is transmitted to the system controller 112 for initiating a self-test action. In some embodiments, the self-test change of state signal CSS can be processed by the system controller 112 as a received change of state signal CSS as if originating from the AMI 106 that can include initiating the event communication to an event communication address and subsequently to the wireless communication address for providing a system status message providing a verification that the system is operational.

The event message module 108 has a memory (not shown) for storing a plurality of event messages EM. Each event message EM includes audio message having a unique event message identifier EMI. The event message module 108 has a control input 124 for receiving a message control signal MCS including an event message identifier EMI that can be selected by the system controller 112 from a plurality of event message identifiers. The event message module 108 also includes an output audio interface 126 for transmitting the event message EM corresponding to the received event message identifier EMI. The event message module 108 also has power input coupled to the switch module 104 for receiving active power $P_A$ from the switch module 104 such that the event message module 108 is in an un-powered state until active power $P_A$ is received. When active power $P_A$ is received, the event message module 108 powers up in preparation for receiving a message control signal MCS from the system controller 112 and then transmits the event message EM to the wireless communication module 110 that is associated with the event message indicator EMI as provided by the message control signal MCS.

Figure 3:
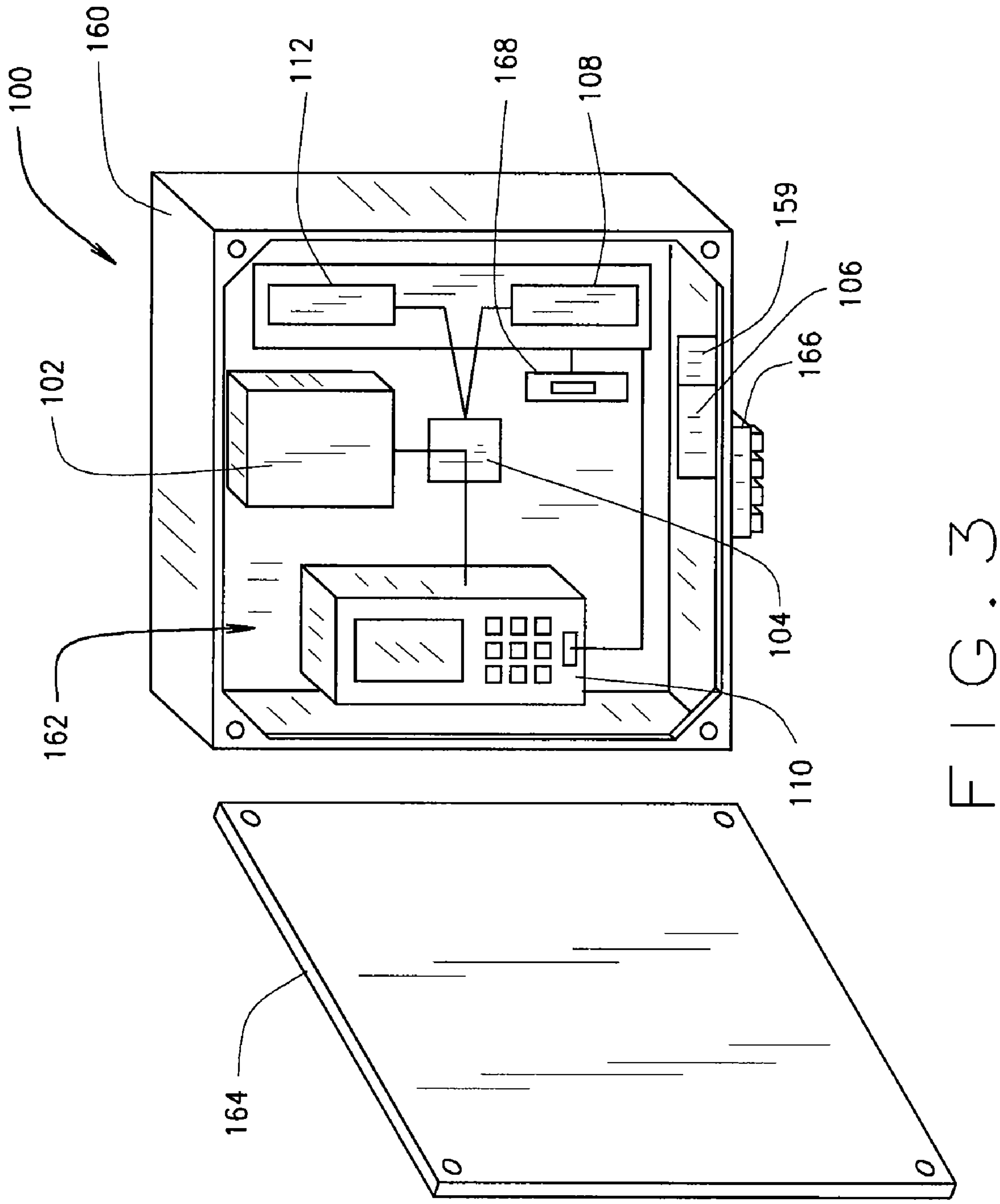
FIG. 3 is a front perspective view of a system for monitoring and reporting of alarm events constructed within a housing according to one exemplary embodiment.

In one embodiment, by way of example only and not intending to be limited thereto, the event message module 108 is a voice recorder/playback integrated circuit, such as an ISD Model 1700 as illustrated in FIG. 3. The voice recorder/playback is configured for storing voice messages as event messages EM and transmitting the event message EM associated with the received event message identifier EMI over the output audio interface 126. The output audio interface 126 can be a microphone or can be an electrical interface that is electrically coupled to an electrical input of the wireless communication module 110. For example, the wireless communication module 110 can be configured to receive the event message EM from the event message module 108 and then transmit the event message EM over a voice channel ("canned" messages) after a voice call is established by the wireless communication module 110 to the event associated wireless communication address WCA.

In some embodiments, the event message module 108 can be configured such that the event message EM is one or more audio tones or sequence of tones. In other embodiments, the event message EM can be a combination of one or more audio tones or sequence of tones with an audio prerecorded voice message.

The wireless communication module 110 can be any communication module that is capable of initiating a wireless communication over a wireless network 128. This can include, but is not limited to a cellular telephone handset, a cellular telephone communication card, or a satellite communication handset or terminal, by way of example. The wireless communication module 110 includes a memory 130 for storing one or more predetermined event communication addresses (ECA) and associated wireless communications addresses WCA, such as telephone numbers and internet addresses. In some embodiments the ECA can be the same as the WCA, but in other embodiments, the ECA is different. The wireless communication module 110 has a power supply input 132 that is coupled to the switch module 104 for receiving active power $P_A$. No local power is provided at the wireless communication module other than the active power $P_A$ received from the switch module 104 when the switch module 104 is activated by the system controller 112. As such, in the embodiments where the wireless communication module 110 is a wireless handset, such as a GSM cellular telephone handset, the handset battery is not used, and the handset only received active power $P_A$ from the switch module 104.

The wireless communication module 110 includes an event address input interface 134 for receiving an event communication address ECA. This can be any suitable input or interface for receiving an event communication address ECA to be contacted when a change of state CSS event occurs. This can include, but is not limited to, a keypad, such as a keypad on a wireless handset. The event address input interface 134 can be a standard input or can be implemented by a mechanical or electrical modification to a standard input as will be addressed by ways of example below.

The wireless communication module 110 also includes a microprocessor 136 that receives active power $P_A$ from the power supply input 132 and the received event communication address ECA from the event address input 134. The microprocessor 136 is configured to determine a wireless communication address WCA from among the plurality stored in the memory that is associated with the received event communication address ECA. The wireless communication module 110 also includes a message input 138 coupled to the event message module 108 for receiving the event message EM and a wireless transceiver 140 configured for communication over the wireless network 128 and originating a communication to the wireless communication address WCA as determined to be associated with the event communication address ECA for transmitting the event message EM.

In some embodiments of the wireless communication module 110 as described herein, a wireless handset, such as a cellular phone or satellite terminal or handset is an offset the shelf unit that is modified for the particular use as the wireless communication module for the system 100. Some modifications can include a modification such that the unit only receives active power from the switch module. In other words, the handset is modified so as to not be powered by a local battery or power supply. In this manner, the handset can be activated remotely by the provisioning of active power and is otherwise dormant or un-powered.

In another modification, the handset wireless communication module 110 can be modified to receive an electrical signal that includes the electronically transmitted analog event message EM. This modification can include an interface to a microphone of the handset or can be a direct electrical interface to the input to the handset that is configured for receiving user voice input such as speech. In this arrangement, the event message module 108 generates and transmits an analog event message ("canned" recorded voice message and/or tones) and the modified handset receives the electrical signal and then transmits the received analog event message over the voice message channel of the wireless communication network 128.

An additional modification can include a modification of the wireless communication module 110 of the keying or keypad interface of the handset so as to automatically receive event communication address ECA input from the system controller 112. In some embodiments, the event communication address ECA input includes a duplication of a keying of a predefined speed dial number stored in the memory (such as the SIM card) of the handset, such that upon receiving the event address input, the handset retrieves one or more predefined telephone numbers as the wireless communication address WCA to be dialed over the wireless communications network 128. The modification can be a mechanical modification such that the keys of the keypad of the handset are mechanically activated. In another embodiment, the modification of the wireless communication module 110 can be an electrical modification such that the keypad is simulated but wherein the event address input is electrically provided to the processor of the handset in lieu of receiving keying from the keypad. In yet another embodiment, the modification of the wireless communication module 110 can be an electromechanical interface such as an electrically controlled mechanical actuator device positioned proximate to the keypad and having an actuating devices for pressing each key of the keypad.

The system controller 112 can be configured from or can include a microprocessor 142 having at least an active mode and a sleep mode, a power interface 144 coupled to the power supply for receiving system power $P_S$, a state change interface 146 coupled to the alarm monitoring interface 106 for receiving the change of state signal CSS, a message control interface 148 for generating the message control signal MCS including the event message identifier EMI, a power activation interface 150 for generating the power activation signal PAS, and an event addressing interface 152 coupled to the event address input interface 134 of the wireless communication module 110 for transmitting the event communication address ECA. The system controller 112 is configured to store in an attached memory 154 and/or local memory 156 various computer instructions including the associations between AMIs 106, CSSs, remote monitored systems and event message indicators EMI, and event communication addresses, and event communication operational plans and procedures, as well as other system operations. It should be understood that system controller 112 can be configured from an integrated circuit wherein one or both of the memory 154, 156 and one or more of the other system controller 112 modules or components of the system 100 can be implemented as integrated functions of the system controller 112.

The system controller 112 is configured to remain in the sleep mode until a change of state signal CSS indicates that a change of state has occurred. Once the system controller 112 detect the change of state signal CSS from the alarm monitoring interface 106, the system controller 112 wakes up and switches to the active mode and begins its system operations. One operation of the system controller 112 is the generation of a power activation signal PAS over the power interface 150. The power activation signal PAS is generated to the switch module 104 for initiating the providing of active power $P_A$ to the event address module 108 and to the wireless communication module 110, both of which change from an un-powered state to a powered state upon receiving the active power $P_A$.

Generally, as discussed above, the alarm monitoring interface 106 can be one or more interfaces and each can monitor one or more remote monitored systems. As such, upon detection of the change of state signal CSS, the system controller 112 determines which one or more alarm monitoring interface 106 and which one or more remote monitored systems is associated with the change of state signal CSS. The system controller 112 is configured to perform an action plan or software instructions that are stored that can be specialized to each such AMI 106 or remote monitored system. The system controller 112 can provide the associated event communication address ECA to the wireless communication module 110 for establishing the appropriate wireless communication to the associated wireless communication address WCA for the particular AMI 106 and/or remote monitored system. Additionally the system controller 112 can provide the appropriate event message identifier EMI to the event message module 108 for transmission of the associated event message EM to the wireless communication module 110.

Each of the plurality of predetermined wireless communication addresses WCA can be telephone numbers having an associated event communication address ECA that can be a speed dial number or abbreviated code. The event communication address input interface 134 can be an address input actuator configured for coupling as a keypad of the wireless communication module 110 for receiving the event communication address ECA. The wireless communication module 110 receives the event communication address ECA through the address input actuator and initiates a wireless communication to the wireless communication address WCA associated with the event communication address ECA without the need for a DTMF dialer. The system can, in some embodiments, initiate the dialing of the wireless communication address WCA multiple times within a given time period or sequentially dial different wireless communications addresses WCA.

In other embodiments, the system controller 112 is configured to store in the attached memory 154 or local memory 156 an event text message associated with a particular AMI 106 and/or remote monitored system. When a change of state CSS occurs associated with such text message, the system controller 112 can be configured to transmit the event message EM as a text message to the event communication address ECA. The wireless communication module 110 (such as a cellular handset) is configured for receiving the text message from the event address input interface of the system controller as if receiving a user input text message (i.e., a short message service (SMS) message, and then transmitting the event text message to the event communication address). Of course those skilled in the art will also understand that the system controller 112 can also be configured to store and transmit a variety of data messages and the wireless communication module 110 can be configured for transmitting the data message. Such, embodiments are considered also within the scope of the present disclosure.

In some such embodiments, the reset 157 (as shown in FIG. 2) can be configured such that the system can be externally reset 157, such as after an change of state signal has been detected, or upon initial set up, can be initiated without opening of the cover to gain access to the internal systems. For example, in one embodiment, a magnetic reed or Hall Effect reset interface 159 as shown in FIG. 3 can be provided within the systems of the cavity for providing the system reset input to the system controller 112. In such embodiments, a magnetic switch 159 is positioned within the cavity 162 along an inner surface of the housing 160. The magnetic reset interface 159 being positioned within the cavity 162 and along the inner surface can be activated by a magnetic field from a magnet positioned on an exterior of the housing 160 proximate to the magnetic reset interface 159 for initiating the system reset 157.

In another embodiment, as shown in FIG. 2, the system 100 can be utilized with a wide range of different types, configurations and manufacturers products of wireless communication modules. As such, the system 100 can be adapted for easy adaptation for two or more wireless communication modules. In one embodiment, a wireless handset selection interface 158 is coupled to the system controller 112 for receiving input from a user usually at the system setup. The user can provide input for identifying a particular model of the wireless communication module 110 to be used and interfaced with the system 100. The system controller 112 is coupled to the wireless handset selection interface 158 and receives the user input and adjusts one or more system configurations or variables to adapt its operations to the particular wireless communication module 110. For example, this can include, but is not limited to an adaptation of the event addressing interface 152 and/or the operation of the system controller 112 to adapt to the particular model of the wireless handset or wireless network 128. As such, the system 100 can be configured to utilize a variety of wireless communication modules 10 and wireless networks 128 and is not limited to a particular technology, wireless network provider, or handset manufacturer or model.

In one exemplary embodiment, the system 100 includes a system controller 112 that is a configured to sense the status of a monitoring loop of an irrigation wheel as discussed above. Such status can include, among others, that the status indicates an alarm condition or a normal condition. In the event of a detected alarm condition, a change of state CSS signal is detected and the system 100 transmits an event message EM as an alarm signal through the wireless network 128, such as a cellular, satellite, or Wi-Fi, to an alarm maintenance or monitoring number, center or person. Additional monitoring functions and status signals CSS can also transmitted through the wireless network 128. Particularly in conjunction with security systems for monitoring irrigations systems at remote agricultural fields, where no electric power lines are present, low power consumption is a desired criterion.

The system 100 and the components and modules thereof are maintained in an extremely low power consumption mode including keeping some modules un-powered until a change of state signal CSS is detected and an event needs to be reported. The wireless communication module 110 and the event message module 108 are kept in an un-powered mode while the system controller 112 is in a low power sleep mode. When the system controller 112 detects a change of state signal CSS, the system controller 112 changes from the sleep mode to the active mode, and generates the power activation signal PAS that results in the wireless communication module 110 and the event message module 108 receiving active power $P_A$. They return to the un-powered state when active power $P_A$ is discontinued.

The system controller 112 includes computer implemented instructions stored on a computer readable medium such as coupled memory 154 or local memory 156, including computer software code and software programming, that are adapted to implement one or more processes as described herein. These include providing active power $P_A$, implementing a delay of $T_D$ until the wireless communication over wireless network 128 is obtained, and then dial one or more wireless communication addresses WCA that are stored in a memory 130, such as a SIM card, that are associated with event communication address ECA, and then transmitting the event message EM, over the voice channel to report to the detected event or change of state CSS.

As shown in FIG. 3, a housing 160 for the system 100 can provide a cavity 162 that is adapted for enclosing and securing all of the system components. As shown, the cavity 162 of the housing 160 can be configured to enclose and secure the power supply 102, the switch module 104, the event message module 108, the wireless communication module 110, and the system controller 112. The housing 160 can also include a cover 164 that is adapted for covering and securing the system components within the cavity 162. In some embodiments, the only external interface required to the internally secured system components is the interface 166 for coupling the remote monitored systems to the AMI 106. The system 100 within the housing 160 does not require coupling to an external power supply (not shown) and does not require coupling to a wireline communication system (not shown). Additionally, in some embodiments a housing tamper module 168 can be provided for detecting that the housing 160 has been opened. In such cases, the housing tamper module can generate a change of state signal CSS and an event message EM can be generated to an event communication address ECA and subsequently to the wireless communication address WCA for reporting.

Figure 4:
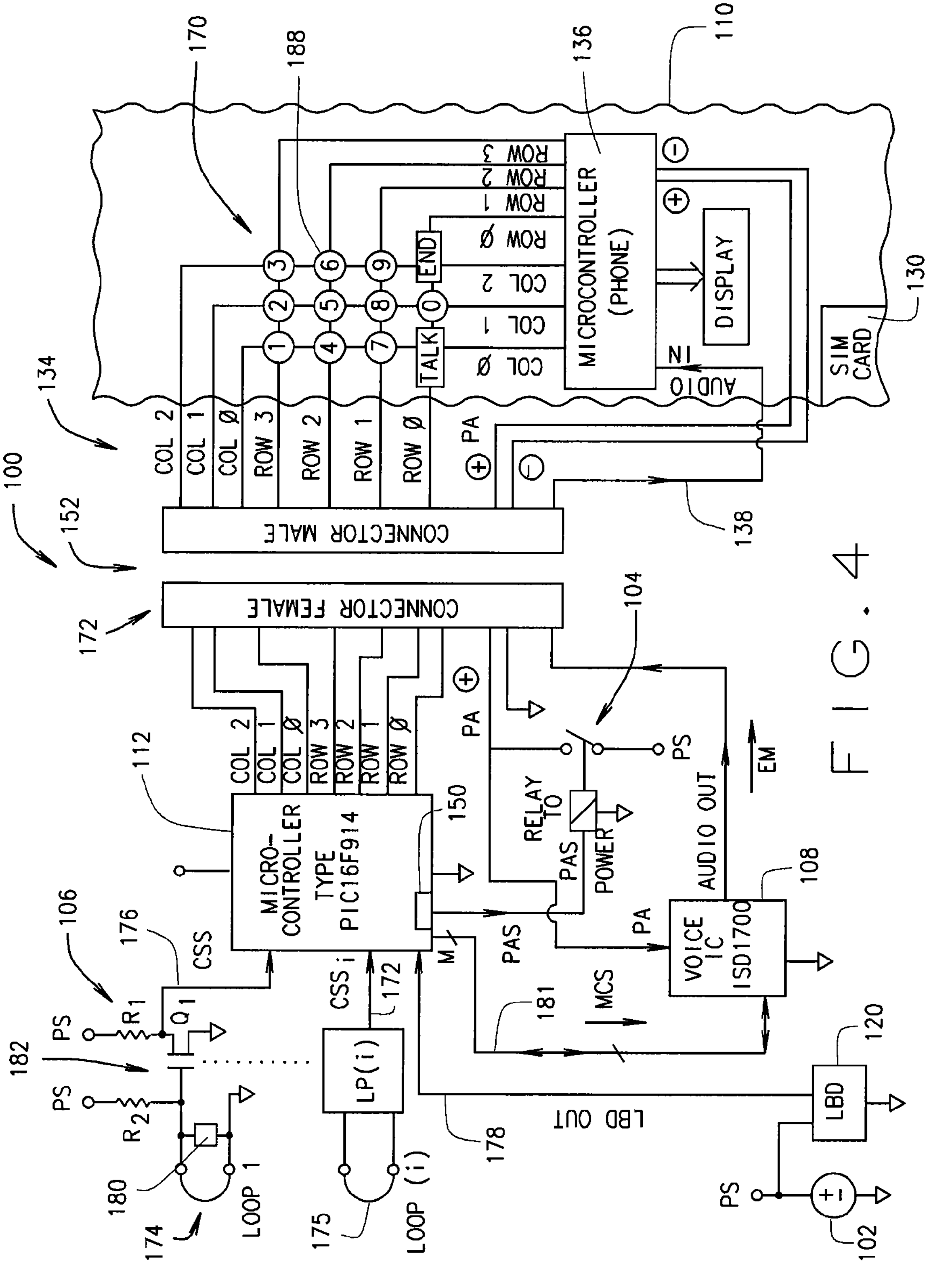
FIG. 4 is a circuit diagram of system for monitoring and reporting of alarm events in accordance with one exemplary embodiment.

Referring now to FIG. 4, a system 100 includes a wireless communication module 110, such as a cellular telephone or a satellite telephone is depicted as a typical phone, without showing the radio frequency (RF) stage. A matrix keypad 170 is connected to the wireless communication module's microcontroller 136. The wireless communication module 120 is powered up from a high capacity maintenance free battery 102, through a power relay 104. The power relay 104 powers up the phone handset 110 under software control running in a system microcontroller 112, and through an IO port 150 as the PAS.

Both the wireless communication device 110 and a voice recorder/playback chip 108 (such as ISD-1700) are powered up through the power relay 104, thus keeping the battery power drain to a minimum.

A connector 172 (male/female) connects interfacing lines from the system microcontroller 112 to the wireless communication device 110. An audio IN line 138 is used to feed prerecorded—messages stored in the recorded/playback chip IC 108 to announce different alarm conditions.

Normally, the system microcontroller 112 is in a sleep mode with low power drain on the battery 102. Microcontrollers, such as system controller 112 or system microprocessor 142, have an extremely low power consumption (in the order of tens of microamperes) while in the sleep mode. The microcontroller 112 exits the sleep mode and starts executing software when a change of state signal CSS is detected, such as when one of the monitoring loops 174 as monitored remote systems changes state.

As shown in FIG. 4, two monitoring loops LOOP 1, designated LOOP 174, and LOOP i, designed LOOP 175 are illustrated by way of example. A signal appearing on a loop open line 176 indicates the status of LOOP 174 as been "open." Similarly, if LOOP 175 is interrupted, a signal on line 177 wakes up the microcontroller 112 and indicates that it has been opened with a status indication of "open."

A low battery detect (LBD) 120 monitors the voltage of the battery 102. If the voltage falls below a pre-determined threshold, a signal $LBD_{out}$ appears on a line 178 to wake up microcontroller 112 to indicate a low battery state. This low battery state will trigger a reporting alarm to service the battery 102.

Even though FIG. 4 illustrates two loops 174 and 175, in other embodiments, a plurality of wire loops 174, 175 or normally closed switches (not shown) can be monitored similarly, and any number of such can be provided and should be considered within the scope of the present disclosure.

The loop 174 maintains in its normal state that is a short to the system ground. A device 180 such as a supresso of MOV (metal oxidevarostor), by ways of example, can be used to safely drain voltage spikes to ground and protect a Field Effect Transistor (FET) 182. When the loop 174 is in its normal state (normally closed), the gate of FET 182 is held to ground potential. Since FET 182 is not biased, FET 182 has a drain terminal that is pulled high to $P_S$ through a resistor R1, and the microcontroller 112 is in a sleep mode.

When the loop 174 is opened, resistor R2 (which is in the order of mega ohms) biases the gate of FET 182, in turn lowering line 176 to ground. This change of state CSS generates an interrupt that wakes up the microcontroller 112, initiating a predetermined software instruction sequence. For example, the microcontroller 112 can poll all the loop lines 174, 175, and determine which loop 174, 175 that has been interrupted and in this instance, determines that loop 174 was interrupted. The microcontroller 112 then initiates an event reporting sequence. This can include powering up the wireless communication module 110 and the recorder/playback module 108. The microcontroller 112 waits until the wireless network 128 carrier. After the running of the predetermined time delay and wireless carrier is obtained, the microcontroller 112 recalls the wireless communication address WCA stored in memory/SIM card 130 contained in wireless communication module 110, and starts dialing those wireless communications addresses WCA's sequentially.

Once the first wireless communication address WCA is dialed, an event message EM stored in a voice playback IC 108 is called up through control line 181, and a recorded message EM is transmitted through the wireless communication module 110 via an audio IN line 138. This event message EM is matched to announce the loop number interrupted, i.e. an example of a message includes: "... vandalism detected in loop 1 . . . " Similarly, if a low battery is detected, the low battery output control line 178 will wake up the microcontroller 112. The microcontroller 112 will then determine that this line was indeed the one that caused the alarm, and in a similar manner will dial up any predetermined number to report a voice can message such as "... low battery ... replace soon ... " etc. Different messages under software control of the microprocessor 112 can be dialed up and reported to different phone numbers, e.g. a low battery is reported to the system maintenance facility while a loop break is reported to the local police.

The contributors to the consumption of the power supply 102 while the system 100 is in stand by mode are: the current draw of the microcontroller 112 in sleep mode (which is extremely low) and the current consumption of the biasing resistors R2, etc., one for each one of the monitoring loops as the AMI 106. The current draw on each one of these loops is also extremely low. An additional contributor to current draw in standby mode (in the order also of microamperes) is the low battery detection module 120.

The loop 175 can be normally closed loop used to monitor the housing tamper module 168 positioned inside the housing 160. If an attempt to open the housing 160 is initiated, the housing tamper module 168 can break loop 175 and initiate a reporting alarm saying, i.e., " . . . system tamper attempt . . . " etc.

An exemplary system microcontroller 112 for use in the present system is manufactured by Microchip, type PIC16F914. A typical voice recording/playback module 108 is manufactured by ISD (Integrated Storage Devices/Winbond) type ISD-1700. Wireless communication addressees WCA such as telephone numbers to dial up on each one of the different change of state signals CSS or alarm states can be stored in the SIM card 130 using the wireless communication module 110. This offers an extremely high flexible mechanism, where pre-programmed SIM cards can be mailed for particular user applications and uses of the system 100.

A self test timer module 122 can be programmed in the microcontroller 112 to initiate a "self test" and therefore wake-up the microcontroller 112 such as every 24 hours, by way of example. An additional wireless communication address can be stored in the memory 130, and a report of a status message, i.e. a message saying " . . . system initiated test—system functional . . . " can be transmitted over the wireless network 128. After the system self test is reported, the system 100 returns to the stand-by mode (e.g., active power $P_A$ is discontinued and the system controller returns to the sleep mode, thereby conserving power and silently monitoring the loops in a low power mode.

As discussed above, the event addressing interface 152 is coupled to the event address input interface 134 of the wireless communication module 110 for transmitting the event communication address ECA. As shown by way of example in FIGS. 5A-5D, the interface between the event addressing interface 152 and the event address input interface 134 can include an address input activator 184 is a key input activator implemented as a specialized printed circuit board that can be overlaid proximate to the keypad 134 for generating keypad input to the keypad mechanically in response to receiving the event communication address ECA from the addressing interface 152 of the system controller 112. While the embodiment illustrated in FIGS. 5A-5D provides for a mechanical interface, one skilled in the art will understand that an electrical or magnetic interface can also be implemented and still would be within the scope of the present disclosure.

Figure 5A:
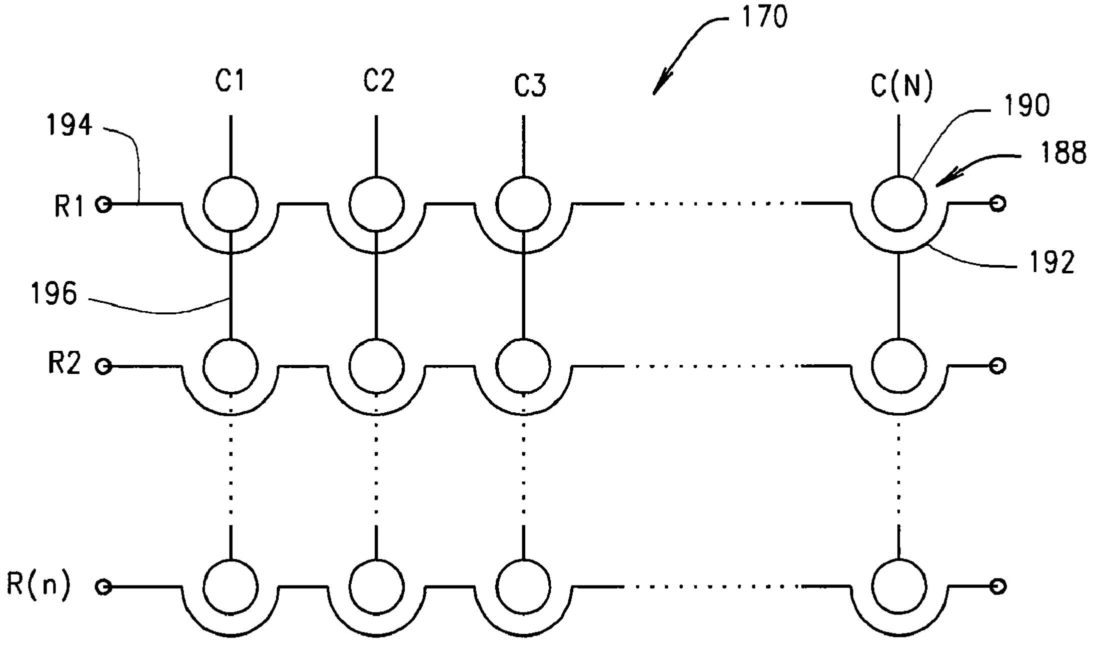
FIGS. 5A-5D are illustrations of an address input actuator for coupling to a keypad for generating keypad input to the keypad for use with a system for monitoring and reporting of alarm events according to one exemplary embodiment.

FIG. 5A illustrates details of a matrix keypad 170 having R(n) rows and C(n) columns of keys 188. The circles depict a center contact 190 for each key 188, with the lower half circles depicting an outer ring contact 192. A row connection 194 interconnects all outer ring contacts of the corresponding row.

Figure 5C:
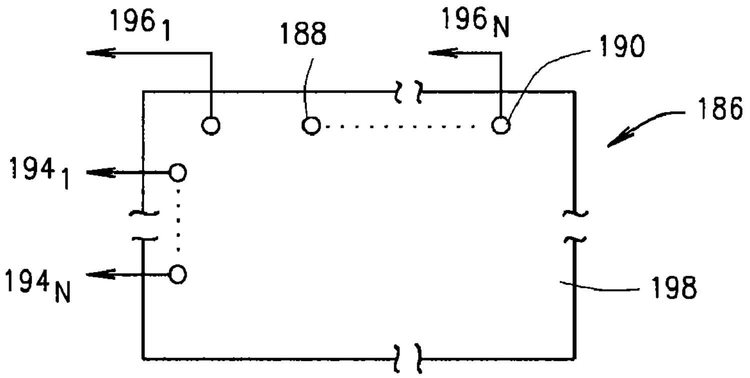
Figure 5D:
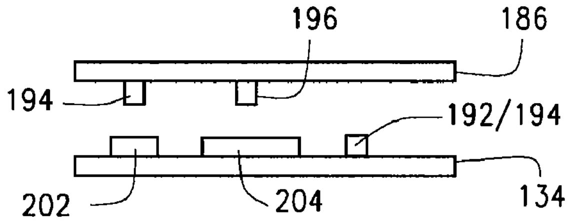
Figure 5B:
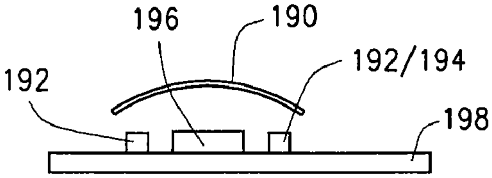

FIG. 5B illustrates the detail of a single key/button. As shown, an insulated base 198 for the keypad 170 supports the key structure. The insulated base 198 is typically a printed circuit board (PCB). The dome 190 can be formed from any suitable material, but in some embodiments is a stainless steel material. By depressing the dome 190, an electrical connection is established between the row connection 194 and the column connection 196 thereby uniquely identifying the particular key 188.

FIG. 5C illustrates the address input activator 184 having a matrix of keys formed on a specialized printed circuit board that can be overlaid proximate to the keypad 134 of the wireless communication module 110. Each individual key 188 can be activated by a correlation of activating the particular row connection $194_n$ with the particular column connection $196_n$. As shown in FIG. 5D, the overlaid PCB 186 is placed over the keypad 134 and aligned so that a row connection pin 194 can activate row connection 202 of the underlying key of keypad 134 and the column connection pin 196 can activate the column connection 204 of keypad 134. Pins 194 and 196 can be of the "spring loaded" pressure type, such as those manufactured by Mill-Max, which are used in testing fixtures known in the industry as "pin beds." These pins, when pressed against matrix keyboard 134 establish an electrically solid connection with the underlying contact.

In accordance with one exemplary embodiment, a high impedance interface is connected in parallel to the telephone switch matrix of any cellular/satellite phone and the keys of the keypad 134 are mapped through a look up table associated with the system microcontroller 112. As such, access to all of the keypad functions and therefore of the wireless communication module 110 can be provided without the need to implement a proprietary serial communication protocol or otherwise between the system controller 112 and any wireless communication module 110 The switch matrix 170 is kept in a tri-state mode when the wireless communication module 110 is executing a command or while in standby mode.

In one exemplary embodiment, an alarm monitoring system 100 that silently monitors a wire loop's continuity and other sensors, while maintaining a very low current consumption, thus extending the life of the internal battery power supply 102. In the event that any of the monitored inputs changes status CSS (i.e., the loop is interrupted, or an alarm event is detected), the system controller 112 "wakes-up" from its idle low power mode and initiates a cycle of dialing one or more different pre-determined stored wireless communication addresses WCA via the internal wireless communication module, such as a wireless handset. This dialing cycle is repeated one or more times, such as three times, with a predetermined interval between each, such as approximately five minutes between them. One or more different states can be monitored and reported by the system 100 and in one embodiment includes three alarm states, each of which can be separately reported via the event message EM as voice announcements alone or a voice announcement interleaved with dual tone multi frequency (DTMF) tones that are indicative of the type of alarm being reported. Sets of three tones can also follow each voice announcement. Different types of tones can be used and chosen. In one embodiment, two distinctive types of tones can be provided, with each single tone being indicative of a particular pre-determined alarm type and a dual tone sequence indicative of a third predetermined alarm type. Each tone can be repeated and interleaved between the voice messages.

The system can be configured to utilize any type of wireless communication module 110 and in some embodiments is configured for using a standard off-the-shelf wireless handset, such as a GSM or CDMA cellular or satellite telephone handset. In such as manner, all change of state events/alarms CSS can be reported to a remote location without the need for a dedicated wire line telephone phone line. The wireless communication module 110 is held in an un-powered state and is only powered up when an alarm has been reported and requires reporting. In such a manner, the wireless communication module 110 can have a significantly longer standalone power life, e.g., operation on a local power supply without the need for local power for charging.

Note that there are two "address books" in most of GSM cellular phones, one address book is saved in the phone's memory and the other is saved in the SIM card 130. In order for the system 100 to report the alarms, the pre-programmed phone numbers as wireless communication addresses WCA should be externally programmed by using an external programming phone with the SIM card 130 installed for programming. After programming, the SIM card 130 is removed from the programming phone and inserted in the internal cellular phone 110 of the system 100.

To program the SIM card 130 content, all of the prior phone numbers stored in the SIM card 130 must first be erased.

2. Next, the FIRST phone number is entered as it will be dialed in the event of an alarm reporting (i.e. 1 212 555 1212) and saved in the first location of the SIM card.
3. Next, similarly the SECOND and THIRD phone numbers are entered and saved. In the event of an alarm, the system sequentially dials out the stored phone numbers in sequential order (first, second and third).
4. If less then three numbers will be dialed, only that number should be entered
5. Once the programming of the SIM card 130 is complete, the SIM card 130 is reinsert in the internal GSM phone 110 of the system 100.
6. Next all monitored loops should be connected to the alarm monitoring interfaces 106.
7. The local power 102 such as a battery is then installed or connected to the system 100.

In some embodiments an alarm report sequence such as following Tables 1-4 can be utilized upon detection of a change of state signal CSS:

TABLE 1

| ALARM TYPE | VOICE ANOUNCEMENT | TONE TYPE | APPROXIMATE CALL LENGTH |
|---|---|---|---|
| External loop break | "System Activated . . ." | SINGLE first tone | 80 seconds |
| Internal tamper switch | "System Activated . . ." | SNGLE second tone | 80 seconds |
| Low internal battery | "Low battery . . ." | DUAL tone | 100 seconds |

TABLE 2

| ALARM TYPE | DIAL # | CALL LENGTH | SYSTEM ACTION |
|---|---|---|---|
| External loop break | 1 | Approx 80" | Continue next |
| | 2 | Approx 80" | Continue next |
| | 3 | Approx 80" | Continue next |
| | NA | NA | IDLE FOR 5 MINUTES |
| | 1 | Approx 80" | Continue next |
| | 2 | Approx 80" | Continue next |
| | 3 | Approx 80" | Continue next |
| | NA | NA | IDLE FOR 5 MINUTES |
| | 1 | Approx 80" | Continue next |
| | 2 | Approx 80" | Continue next |
| | 3 | Approx 80" | SYSTEM QUITS UNTIL A RESET IS PERFORMED |

TABLE 3

| ALARM TYPE | DIAL # | CALL LENGTH | SYSTEM ACTION |
|---|---|---|---|
| Box Tamper | 1 | Approx 80" | Continue next |
| | 2 | Approx 80" | Continue next |
| | 3 | Approx 80" | Continue next |
| | NA | NA | IDLE FOR 5 MINUTES |
| | 1 | Approx 80" | Continue next |
| | 2 | Approx 80" | Continue next |
| | 3 | Approx 80" | Continue next |
| | NA | NA | IDLE FOR 5 MINUTES |
| | 1 | Approx 80" | Continue next |
| | 2 | Approx 80" | Continue next |

TABLE 3-continued

| ALARM TYPE | DIAL # | CALL LENGTH | SYSTEM ACTION |
|---|---|---|---|
| | 3 | Approx 80" | SYSTEM QUITS UNTIL A RESET IS PERFORMED |

TABLE 4

| ALARM TYPE | DIAL # | CALL LENGTH | SYSTEM ACTION |
|---|---|---|---|
| Low Battery | 1 | Approx 80" | Continue next |
| | 2 | Approx 80" | Continue next |
| | 3 | Approx 80" | Continue next |
| | NA | NA | IDLE FOR 5 MINUTES |
| | 1 | Approx 80" | Continue next |
| | 2 | Approx 80" | Continue next |
| | 3 | Approx 80" | Continue next |
| | NA | NA | IDLE FOR 5 MINUTES |
| | 1 | Approx 80" | Continue next |
| | 2 | Approx 80" | Continue next |
| | 3 | Approx 80" | SYSTEM ACTION CONTINUE TO MONITOR FOR LOOP BREAK OR BOX TAMPER SEE NOTE |

Figure 6:
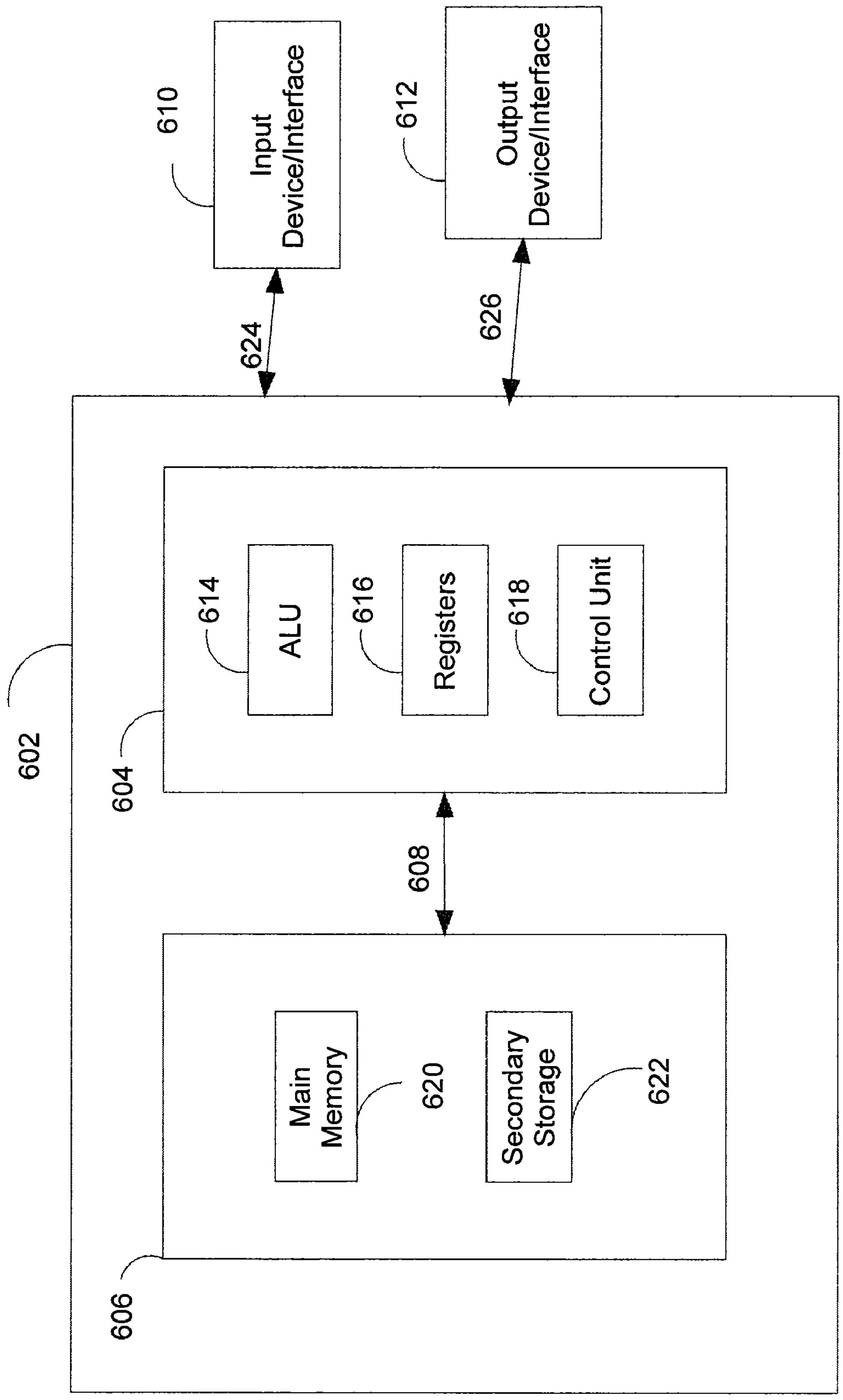
FIG. 6 is a block diagram of a computer system that may be used to implement one or more embodiments and/or one or more components or modules of the system for monitoring and reporting alarm events.

Referring to FIG. 6, an operating environment for an exemplary embodiment of a remote location monitoring and alarm reporting system including one or more components or modules thereof is a computer system 600 with a computer 602 that comprises at least one high speed processing System (CPU) 604, in conjunction with a memory system 606 interconnected with at least one bus structure 608, an input device 610, and an output device 612. These elements are interconnected by at least one bus structure 612.

The illustrated CPU 604 is of familiar design and includes an arithmetic logic unit (ALU) 614 for performing computations, a collection of registers 614 for temporary storage of data and instructions, and a control System 616 for controlling operation of the system 600. Any of a variety of processors, including at least those from Digital Equipment, Sun, MIPS, Motorola, NEC, Intel, Cyrix, AMD, HP, and Nexgen, is equally preferred for the CPU 604. The illustrated embodiment of the system operates on an operating system designed to be portable to any of these processing platforms.

The memory system 606 generally includes high-speed main memory 620 in the form of a medium such as random access memory (RAM) and read only memory (ROM) semiconductor devices, and secondary storage 622 in the form of long term storage mediums such as floppy disks, hard disks, tape, CD-ROM, flash memory, etc. and other devices that store data using electrical, magnetic, optical or other recording media. The main memory 620 also can include video display memory for displaying images through a display device. Those skilled in the art will recognize that the memory system 606 can comprise a variety of alternative components having a variety of storage capacities and can include a subscriber identity or information module (SIM) such as a GSM SIM Card, in one embodiment.

The input device 610 and output device 612 are also familiar. The input device 610 typically comprises a keyboard, but can also include a mouse, a touch screen, a physical transducer (e.g. a microphone), etc. and is interconnected to the computer 602 via an input interface 624. The output device 612 can comprise a display but can also include a printer, a transducer (e.g. a speaker), etc, and be interconnected to the computer 602 via an output interface 626. Some devices, such as a network adapter or a modem, can be used as input and/or output devices.

As is familiar to those skilled in the art, the computer system 600 further includes an operating system and at least one application program. The operating system is the set of software which controls the computer system's operation and the allocation of resources. The application program is the set of software that performs a task desired by the user, using computer resources made available through the operating system. Both are resident in the illustrated memory system 606.

In accordance with the practices of persons skilled in the art of computer programming, the present system is described below with reference to symbolic representations of operations that are performed by the computer system 600. Such operations are sometimes referred to as being computer-executed. It will be appreciated that the operations which are symbolically represented include the manipulation by the CPU 604 of electrical signals representing data bits and the maintenance of data bits at memory locations in the memory system 606, as well as other processing of signals. The memory locations where data bits are maintained are physical locations that have particular electrical, magnetic, or optical properties corresponding to the data bits. The system can be implemented in a program or programs, comprising a series of instructions stored on a computer-readable medium. The computer-readable medium can be any of the devices, or a combination of the devices, described above in connection with the memory system 606.

When describing elements or features and/or embodiments thereof, the articles "a", "an", "the", and "said" are intended to mean that there are one or more of the elements or features. The terms "comprising", "including", and "having" are intended to be inclusive and mean that there may be additional elements or features beyond those specifically described.

Those skilled in the art will recognize that various changes can be made to the exemplary embodiments and implementation described above without departing from the scope of the disclosure. Accordingly, all matter contained in the above description or shown in the accompanying drawings should be interpreted as illustrative and not in a limiting sense.

It is further to be understood that the processes or steps described herein are not to be construed as necessarily requiring their performance in the particular order discussed or illustrated. It is also to be understood that additional or alternative processes or steps may be employed.

What is claimed is:

1. A system for monitoring and reporting of alarm events occurring in a remote monitored system comprising:

a power supply dedicated to the system and having an output power interface for providing system power;

a switch module receiving system power from the power supply and having a power control input for receiving a power control signal, wherein the switch module selectively provides the system power as active power responsive to the received power control signal;

an alarm monitoring interface configured for interfacing with the remote monitored system and configured for receiving a plurality of status indicators from the remote monitored system and generating a signal indicating a change of state;

an event message module having a memory for storing a plurality of event messages, each event message being an audio message having a unique event message identifier, a control input for receiving a message control signal including an event message identifier selected from the plurality of event message identifiers, an output audio interface for transmitting the event message corresponding to the received event message identifier, and a power input coupled to the switch module for receiving active power from the switch module;

a wireless communication module having a memory for storing a plurality of predetermined communication addresses, a power supply input coupled to the switch module for receiving active power, an event address input interface configured for receiving an event communication address, a controller receiving active power from the power supply input and the received event communication address from the event address input interface and determining a particular one of the predetermined communication addresses stored in the memory that is associated with the event communication address, a message input coupled to the event message module for receiving the event message, and a wireless transceiver configured for communication over a wireless network and originating a communication to the particular predetermined communication address for transmitting the event message; and a system controller including a microprocessor having at least an active mode and a sleep mode, a power interface coupled to the power supply for receiving system power, a state change interface coupled to the alarm monitoring interface for receiving the change of state signal, a message control interface for generating the message control signal including the event message identifier, a power activation interface for generating the power activation signal, and an addressing interface coupled to the event address input interface of the wireless communication module for transmitting the event communication address.

2. The system of claim 1 wherein the event message module and the wireless communication module are each unpowered until active power is received from the switch module, and wherein the system controller is in the sleep mode and changes to the active mode when the change of state is detected.

3. The system of claim 1 wherein the alarm monitoring interface includes two electrical contacts and a resistance device shunted across the two electrical contacts.

4. The system of claim 3 wherein the alarm monitoring interface includes a power interface for receiving system power from the power supply, and a field effect transistor (FET) having a gate coupled to detect an open between the two electrical contacts and to generate a change of state signal.

5. The system of claim 1 wherein the system controller is configured to remain in the sleep mode until active power the change of state is detected, the system controller configured to detect the change of state signal from the alarm monitoring interface and to generate the power activation signal over the power interface to the switch module upon a detection of a change of state signal.

6. The system of claim 1 wherein the power supply is a battery, the switch module is a relay, and the wireless communication module is at least one of a cellular telephone handset and a satellite communication terminal.

7. The system of claim 1 wherein the alarm monitoring interface is configured for interfacing with a plurality of remote monitored systems.

8. The system of claim 7 wherein the plurality of remote monitored systems includes systems selected from the group consisting of normally closed loops, normally open loops, event messages, variable voltage outputs, variable current outputs, and variable impedances.

9. The system of claim 7 wherein the system controller is configured to receive the change of state signal from one of the plurality of remote monitored systems, to associate the change of state signal with an event communication address and with an event message.

10. The system of claim 1 wherein the event message module is a voice recorder/playback integrated circuit configured for storing voice message and transmitting the event message associated with the received event message identifier over the output audio interface and wherein the wireless communication module is configured for transmitting the event message over a voice channel after a call is established to the particular communication address.

11. The system of claim 1 wherein the event message includes an audio tone and an audio prerecorded voice message.

12. The system of claim 1, further comprising a low battery detection module coupled for receiving system power and determining when the received power is less than a predetermined power level, and having an output configured for generating a low battery signal when the system power is determined to be less than the predetermined power level, wherein the system controller includes a lower battery interface configured for receiving the low battery signal and for processing the low battery signal as a change of state signal.

13. The system of claim 1 wherein each of the plurality of predetermined communication addresses are telephone numbers having an associated event communication address and wherein the event address input interface is an address input actuator coupled to the wireless communication module for transmitting the event communication address, wherein the wireless communication module receives the event communication address and initiates a wireless communication to the telephone associated with the event communication address without the need for a DTMF dialer.

14. The system of claim 1, further comprising a self-test module coupled to the system controller for generating a pre-determined self-test event including a self-test change of state signal and wherein the system controller treats the self-test change of state signal as a received change of state signal received from the alarm monitoring interface.

15. The system of claim 1, further comprising a housing having a cavity adapted for enclosing and securing the power supply, the switch module, the event message module, the wireless communication module, and the system controller, wherein each of the power supply, the switch module, the event message module, the wireless communication module, and the system controller are each positioned within the cavity of the housing.

16. The system of claim 15, further comprising a magnetic reset interface coupled to the system controller for providing a system reset input to the system controller, the magnetic reset interface being positioned within the cavity of the housing and configured for receiving a magnetic field from a magnet positioned on an exterior of the housing proximate to the magnetic reset interface for initiating the system reset input.

17. The system of claim 1 wherein the wireless communication module is a wireless handset modified as follows:

to only receive active power from the switch module and only to be active with receiving active power, to receive an electrical signal including an analog event message from the event message module, and to receive key input through an address input actuator without human input, further comprising an address input actuator coupled to the wireless communication module for providing key input in response to receiving the event communication address from the addressing interface of the system controller.

18. The system of claim 17 wherein the system controller is configured to store and transmit the text message as a text message and wherein the wireless handset is configured for receiving the text message via the key pad from the address input actuator and transmitting the event text message as a short message service message (SMS).

19. The system of claim 1 wherein the system controller is configured to store and transmit a data message and wherein the wireless communication module is configured for transmitting the data message.

20. A system for monitoring and reporting of events occurring at a rural location to a remote location comprising:

a power supply dedicated to the system for providing system power;

a switch module receiving system power from the power supply and having a power control input for receiving a power control signal, wherein the switch module selectively provides the system power as active power responsive to the received power control signal;

an alarm monitoring interface configured for interfacing with a plurality of remote monitored systems and configured for receiving a signal from each remote monitored system indicating a change of state;

an event message module including a recorder/playback component having a memory for storing a plurality of event messages, each event message having a unique event message identifier and including a tone and an audio voice message, a control input for receiving a message control signal including an event message identifier selected from the plurality of event message identifiers, an output audio interface for transmitting the event message corresponding to the received event message identifier, and a power input coupled to the switch module for receiving active power from the switch module, the event message module being un-powered when not receiving active power;

a wireless handset having a memory for storing a plurality of telephone numbers as communication addresses, a power supply input coupled to the switch module for receiving active power, a keypad configured for receiving an event communication address and modified to receive coupled input from a address input actuator coupled to the wireless handset, a controller receiving the received event communication address from the address input actuator and determining a particular one of the telephone numbers associated with the event communication address, an audio interface modified for receiving the event message from the event message module as an electrical signal, and a wireless transceiver configured for communication over a wireless network and originating a communication to the determined telephone and transmitting the event message over an established audio transmission link, the wireless handset being un-powered until receiving active power;

a system controller including a microprocessor having an active mode and a sleep mode, a power interface coupled to the power supply for receiving system power, a state change interface coupled to the alarm monitoring interface for receiving the change of state signal, a power activation interface for generating the power activation signal, wherein the system controller is configured to detect the change of state signal from the alarm monitoring interface and to change state from the sleep mode to the active mode and to generate the power activation signal over the power interface responsive thereto, and to associate the change of state signal with an event communication address and an event message identifier, the system controller further having a message control interface for generating the message control signal including the event message identifier, and an addressing interface for transmitting the event communication address;

an address input actuator coupled to the wireless handset configured for generating key input in response to receiving the event communication address from the addressing interface of the system controller; and a housing having a cavity, wherein each of the power supply, the switch module, the event message module, the wireless handset, and the system controller are each positioned within the cavity of the housing.

21. The system of claim 20 wherein the alarm monitoring interface includes two electrical contacts and a resistance device shunted across the two electrical contacts and a field effect transistor (FET) having a gate coupled to detect an open between the two electrical contacts and to generate a change of state signal.

22. The system of claim 20 wherein the plurality of remote monitored systems includes systems selected from the group consisting of normally closed loops, normally open loops, event messages, variable voltage outputs, variable current outputs, and variable impedances.

23. The system of claim 20, further comprising a low battery detection module coupled for receiving system power and determining when the received power is less than a predetermined power level, and having an output configured for generating a low battery signal when the system power is determined to be less than the predetermined power level, wherein the system controller includes a lower battery interface configured for receiving the low battery signal and for processing the low battery signal as a change of state signal.

24. The system of claim 20, further comprising a self-test module coupled to the system controller for generating a pre-determined self-test event including a self-test change of state signal and wherein the system controller treats the self-test change of state signal as a received change of state signal received from the alarm monitoring interface.

25. The system of claim 20, further comprising a magnetic reset interface coupled to the system controller for providing a system reset input to the system controller, the magnetic reset interface being positioned within the cavity of the housing and configured for receiving a magnetic field from a magnet positioned on an exterior of the housing proximate to the magnetic reset interface for initiating the system reset input.

26. The system of claim 20 wherein the system controller is configured to store and transmit the event message as a text message and wherein the wireless handset is configured for receiving the text message via the key pad from the address input actuator and transmitting the event text message as a short message service message (SMS).

27. The system of claim 20, further comprising a wireless handset selection interface configured for receiving input from a user in identifying a particular model of the wireless handset, wherein the system controller is coupled to the wireless handset selection interface for receiving the received user input and to adjust a configuration of the addressing interface and operation of the system controller to adapt to the particular model of the wireless handset associated with the received user input.

28. A system for monitoring and reporting of events occurring at rural locations comprising:

a housing having a cavity and a cover for closing the cavity, said cavity having means for securing the cover in a closed position;

means for providing system power;

means for detecting a change of state of a remote monitored system;

means for providing active power in response to detecting a change of state event and discontinuing the providing of active power when no change of state event is detected;

means for determining an event communication address and event message associated with the detected change of state of the remote monitored system; the means for determining being in a sleep mode until a change of state is detected;

means for initiating a wireless communication over a wireless communication system to the event communication address responsive to detecting a change of state, the means for initiating wireless communication being un-powered until receiving active power; and means for transmitting the event message over the wireless communication system in response to detecting a change of state event, the means for transmitting an event message being un-powered until receiving active power.

* * * * *